Figure 1:
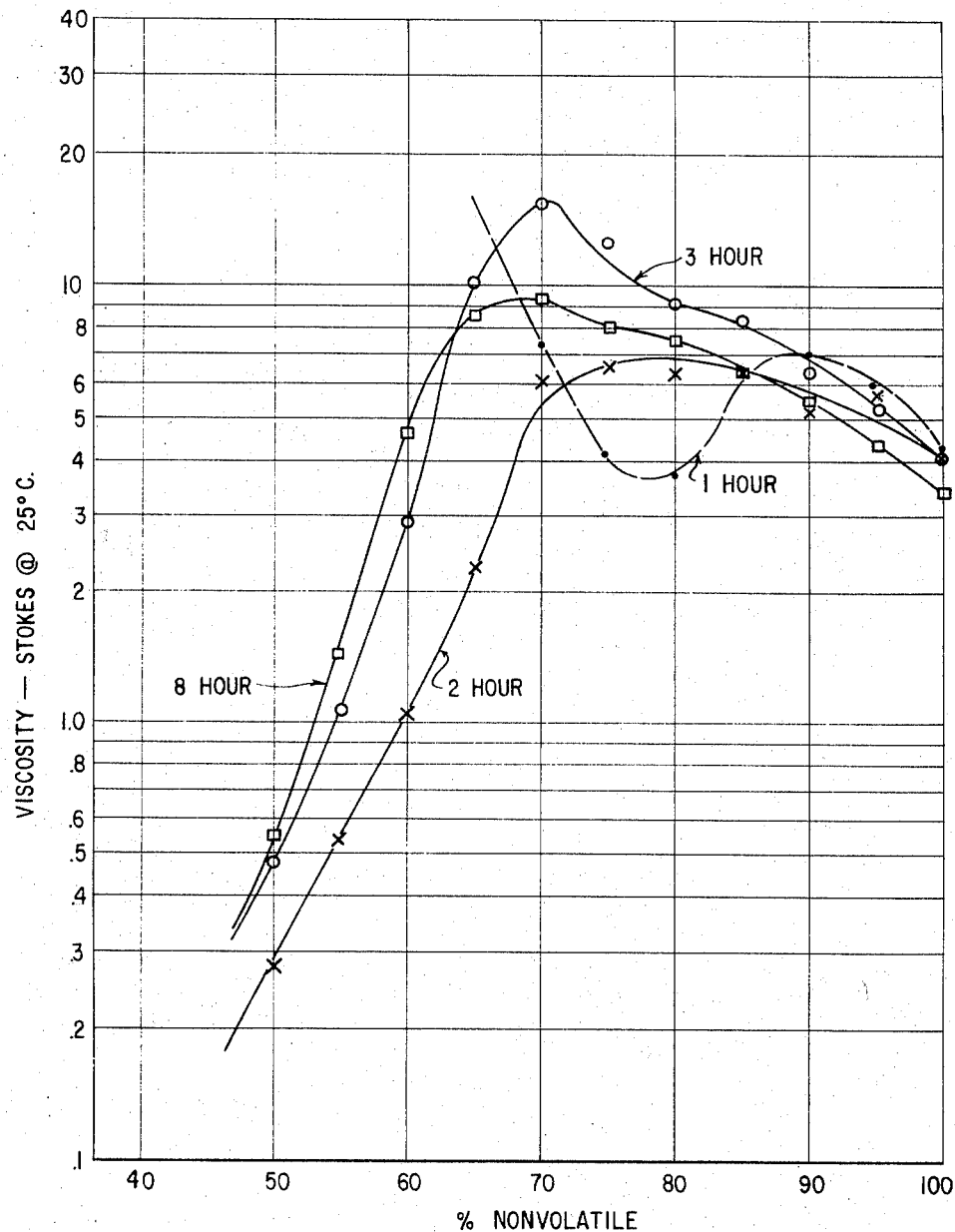

United States Patent Office 3,438,795
Patented Apr. 15, 1969

3,438,795
WATER DISPERSIBLE COMPOSITION CONTAINING A REACTION PRODUCT OF A MODIFIED DRYING OIL COMPONENT AND AN ALKOXY POLYALKYLENE GLYCOL
Herbert M. Schroeder, Williamsville, and Stanton E. Walker, Westfield, N.Y., assignors to Textron Inc., Providence, R.I., a corporation of Rhode Island
Filed Aug. 10, 1961, Ser. No. 130,542
Int. Cl. C09d 3/26
U.S. Cl. 106—254                      11 Claims The need for water-thinned oil or oleoresinous paints and similar protective coatings in which the vehicle is water-soluble or dispersible has been recognized for a long time by the paint industry. Synthetic latex emulsions provide vehicles which are useful for many paints, but they are subject to certain limitations insofar as paint properties are concerned. For example, in the case of exterior paints, synthetic emulsion paints do not contain high total solids and hence require multiple coats to attain optimum film thickness and consequent hiding power and durability. Also, synthetic emulsion paints do not penetrate and "wet" chalked surfaces hence cannot be used on old repaint surfaces unless the latter are first primed with a solvent-thinned oil or alkyd paint to bind the chalk face. Another disadvantage of synthetic emulsion paints is that they cannot readily be formulated to attain a glossy finish.

In order to overcome these and other disadvantages of synthetic emulsion paints, while maintaining the advantages of water-thinning and water-cleanup, there have been a number of attempts to develop water-thinned oil or oil-modified resin paints which would have the other desirable properties of oil base paints such as ability to wet chalky surfaces, practical film thickness in a minimum number of coats, high gloss if desired, etc. It is possible to make emulsions of oils or oil-modified resins by the use of external emulsifiers and conventional emulsification techniques. However, such emulsions are subject to most of the drawbacks characterizing synthetic emulsions insofar as their paint use is concerned and they are in addition generally unstable, tending to separate into oil and aqueous layers.

Various attempts have been made to solve the problem of making suitable water-thinned oil or oleoresinous paint vehicles. For example, Arndt Patent 2,634,245 is directed to water-dispersible alkyd type resins which form emulsions when dispersed in water. The Arndt process calls for the reaction of 70 to 90% by weight of an oil-modified alkyd resin with 10 to 30% by weight of polyethylene glycol. Arndt's alkyd resin used in this process and made, for example, by reacting phthalic anhydride and glycerol with the modifying oil, e.g., a mixture of soybean and tung oils or linseed oil, contains 30 to 60% by weight of oil. The resulting resin is a solid or semi-solid product with a viscosity as specified by Arndt of W to Z or above when diluted in 50% by weight of naphtha, of $Z_3$ at a concentration of 50% by weight in petroleum naphtha boiling at 310 to 410° F. as specifically illustrated in Arndt's Example I. This type of resinous product, when reacted with polyethylene glycol, yields a reaction product which does not have the inherent advantages found in a drying oil paint and, also results in paints of low vehicle and paint solids.

In the British publication, JOCCA 40, 849–862 (October 1957) F. Armitage, and L. G. Trace, point up on p. 852 some of the shortcomings of the Arndt process, particularly the difficulty of obtaining good emulsion stability and good film characteristics at the same time. In the authors' attempt to avoid the primary problems encountered with the Arndt product made by reacting an oil-modified alkyd resin with polyethylene glycol, Armitage and Trace proposed a modification in which the polyethylene glycol is built-in the alkyd resin by reacting the polyglycol in admixture with the individual ingredients used to prepare the oil-modified alkyd resin. Armitage and Trace, like Arndt, used short oil length alkyds, 50 to 56% oil-modified, and noted that in their process increasing the oil length resulted in a decrease of dispersibility of the product; they concluded for this and other reasons that their work leaves a considerable programme to be accomplished if certain defects in the Armitage-Trace paints are to be overcome.

The present invention utilizes a reaction between a drying oil component and an unique polyether, namely alkoxy polyalkylene glycols which have only one hydroxyl group, the other end of the polyether chain being terminated by an alkoxy group. Typical of such polyethers would be methoxy polyethylene glycol (MPEG). In our investigations, in an attempt to obtain or retain the desired properties of a drying oil paint, we reacted an alkoxy polyalkylene glycol with drying oils, including drying oils modified with various amounts of modifying agents, e.g., oil-modified alkyd resins. The resulting oil and oil-modified reaction products were liquids with lower viscosities than the high viscosity alkyd resin products of Arndt. We found that the drying oil reaction products made with alkoxy polyalkylene glycols of about 200 molecular weight and above are easily dispersible in substantial amounts of water to form stable aqueous dispersions and that these reaction products can be diluted with water only or with small amounts of a coupling solvent such as ethylene glycol monobutyl ether, prior to dilution with water. We found that paints made from dispersions of this type, including paints containing reaction products of the higher molecular weight alkoxy polyalkylene glycols, e.g., methoxy polyethylene glycol (MPEG) 750 as well with the lower molecular weight MPEG 350 and the liquid oil or oil-modified products, were characterized by good flow and good levelling after brush application.

We have found thus that oil-modified compositions can be more readily dispersed in water to yield stable vehicles if only one end of a polyethylene glycol is combined with the oleoresinous component. This type of configuration is substantially absent in the compositions proposed by the prior art which utilize polyethylene glycols terminated at each end with an hydroxyl group. Moreover, the procedures by which our compositions can be made are subject to considerable variation, for instance, in the order of adding the reactants.

When polyethylene glycol is incorporated into the oleoresinous material, the reaction might be continued until full equilibrium is established. However, the product of overall optimum performance is usually obtained at some point in the reaction before equilibrium is established. If the reaction is continued to equilibrium, products of higher viscosity and poorer dispersion characteristics are obtained. Hence, the reaction should be followed by considerable empirical testing of samples to determine or correlate reaction time with performance as a dispersion or as a film former.

We have found that a superior aqueous dispersion of the reaction product with good film properties may be obtained while minimizing much of this empirical testing if one end of a polyether polyol is blocked by means of an alkoxy group. If an alkyl polyether such as methoxy polyethylene glycol is reacted with the oleoresinous film former more stable dispersions are obtained without the tedious testing requirements of the polyethylene glycol modifications. The dilution curves of FIG. 1 illustrate the effect of reaction time on the composition of Example 2. In this instance after only one hour of reaction time, insufficient reaction has occurred between the polyether and the modified oil to give a dispersion of the oil in water. At about 85% NV a marbelized instable dispersion is obtained and upon further addition of water an inverted water in oil emulsion of high viscosity begins to form. After two hours of reaction time an acceptable dilution curve is obtained which results in a stable vehicle of application viscosity (1 to 2 stokes) at about 60% NV. The dilution curve shifts somewhat after another hour of reaction but remains substantially the same between the 3 and the 8 hour reaction time. Thus, when using the alkoxy terminated polyethers the characteristics of the product are relatively stable with respect to reaction time and the necessity for close process control, and extensive sampling and testing is materially reduced.

The use of alkoxy terminated polyalkylene glycols of this invention also permits a wider choice of modified oils and resins in obtaining useful products which may be used as the vehicle for water thinned paints and the like. The oil-modified compositions of the present invention provide paints having the desired advantages of air drying oil paints in that they form thin films which are converted by oxidation to hard, dry films having resistance to water, ultraviolet light and other film degrading factors. They also provide paints having the desired advantages of water-soluble paints including low odor, nonflammable and diminished toxicity, as well as water cleanup of brushes, tools used in painting, etc.

The compositions of the present invention, unlike the latex emulsion paints which lack mechanical stability and thus require special and involved pigmenting procedures, provide stable paint vehicles which can be pigmented in the conventional manner of grinding pigments in the paint vehicles. This applies to alkaline pigments including zinc oxide which due to its fungistatic or mildewcidal properties is highly desired in paint and which ordinarily cannot be used in the latex emulsion paints due to sensitivity of emulsions to such materials.

Unlike the latex emulsion paints where the physical nature of the emulsion imposes limitations upon the total solids, the compositions of the present invention also permit the formulation of paints characterized by high percentages of total solids thus minimizing the number of coats of paint which must be applied to obtain good coverage and hiding as well as durability on weathering. In addition to fewer coats to do the required painting job, the paint compositions of the present invention, unlike emulsion paints, have been found to wet, penetrate and firmly adhere to substrates such as the chalky surfaces of weathered previously painted surfaces and thus our paints are eminently satisfactory for exterior use.

As stated, our water-dispersible paint vehicle is made through reaction of a drying oil component and an alkoxy polyalkylene glycol. Depending on the nature of the desired product the drying oil component contains at least about 25 and upwards to or above about 90, weight percent of a drying or unsaturated fatty acid in esterified form. The presence of at least about 80% of the ester, for instance, provides a vehicle of excellent characteristics for use on exterior surfaces and insures maximum compatibility with zinc oxide. Thus the drying oil component may be used as such or it may be reacted with up to about 20 or even up to about 40 or 75 weight percent of a modifying constituent prior to or while making the water-dispersible vehicle of this invention through reaction with the alkoxy polyalkylene glycol. These percentages are based on the mixture of drying oil component and modifying constituents. The modifying material contains a polyfunctional group or configuration, that is it can combine, e.g., through olefin-bond polymerization or condensation, with two or more molecules of the drying oil component or a modifying constituent. A portion of the modifying material may be monofunctional, e.g., a monocarboxylic acid such as a benzene monocarboxylic acid; and this component will usually be a minor proportion of the total modifying constituents.

The drying oil component and alkoxy polyalkylene glycol are generally condensed in a proportion of about 70 to 90 weight percent of drying oil component to about 10 to 30 weight percent of the alkoxy polyalkylene glycol based on their mixture. Preferably, the alkoxy polyalkylene glycol reactant is about 12 to 20 weight percent based on its mixture with the drying oil component. The amount of alkoxy polyalkylene glycol to be employed may vary with the nature of the desired product; in general, higher quantities of the alkoxy polyalkylene glycol will impart more hydrophilic character and consequent water solubility. The precise choice of quantity of alkoxy polyalkylene glycol employed may, however, vary with the characteristics, e.g., viscosity, of the oil or modified oil used. The choice will also vary with the desired solution viscosity as well as the drying time and other characteristics of the product.

The useful alkoxy polyalkylene glycols have the formula

$$RO[(CH_2)_xO]_yH$$

where $x$ is from 2 to 3, $y$ is an integer, usually from 4 to 50, preferably 7 to 20, and R is advantageously an alkyl radical of up to about 4 carbon atoms. However, larger alkyl groups even including 18 or 20 carbon atoms may be used. We prefer R to be methyl. These materials generally have an average molecular weight of about 200 to 2,500 or more and advantageously the molecular weight is in the range of about 300 to 800. Alkoxy polyethylene glycols are the preferred materials and they may contain a minor amount of alkoxy polypropylene glycol. It will be understood that blends of higher and lower molecular weight alkoxy polyalkylene glycols to yield mixtures within the approximate foregoing molecular weight ranges are also contemplated as is illustrated in the examples.

In general, any of the above alkoxy polyalkylene glycols may be used with any of the drying oil components to obtain water thinnable materials having utility as paint vehicles. Specific characteristics of these latter vehicles can be varied to some degree by the proper choice of ingredients. For example, the higher molecular weight alkoxy polyalkylene glycols have been demonstrated to yield tough, durable films with desirable exterior exposure characteristics. The reaction products based on the lower molecular weight alkoxy polyalkylene glycols yield aqueous solutions of lower viscosity, hence enabling the formulation of paints with high vehicle non-volatile and consequently high total paint solids. By using the alkoxy terminated polyethers to form the products of this invention it is possible to prepare useful vehicles containing no coupling solvent which may or may not yield completely clear solutions at desirable viscosity and non-volatile levels for many paint systems, but in any event do have sufficient stability to permit direct pigmentation and have no need for the multiplicity of additives used in latex paint emulsions.

Similarly, the specific properties of the products can be varied to a degree by the choice of the drying oil component. For example, it may be desirable to base a product on a semi-drying oil such as soybean oil to obtain slower drying characteristics where the material is to be employed to improve the adhesion of synthetic latex paints or otherwise as an adhesive agent. The products of the invention which are based on linseed oil and certain of the modified linseed oils have been shown to have durability characteristics equivalent to those of conventional linseed oil, when formulated into exterior paint vehicles.

It may sometimes be desirable to include a coupling solvent in the composition in order to increase the dispersion range of the reaction product in water, for instance it is most advantageous to obtain a dispersion in water at a dilution which gives a composition having a viscosity in the approximate 0.5 or 1 to 3 poise range desired for surface application, and with some of the compositions of this invention, the addition of coupling solvent is effective in extending the stability of the aqueous dispersion. Thus after the reaction product is formed it may be mixed with up to about 30 weight percent of the coupling agent for instance about 5 or 10 to 25 weight percent of an oil and water-soluble coupling agent. The agents are often oxygenated organic compounds such as ethers, alcohols or esters. Preferred coupling agents are ethylene glycol ethers having the formula $$RO(CH_2CH_2O)_xR_1$$

wherein R is a monovalent hydrocarbon radical having up to about 8 carbon atoms, preferably not more than about 5 carbon atoms, $x$ is 1 to 2 and $R_1$ is hydrogen or $$-\overset{O}{\underset{\|}{C}}-CH_3$$

Advantageously, R is a lower alkyl radical having, for instance, 1 to 4 or more carbon atoms. Included within the oil and water-soluble coupling agents are ethylene chlorohydrin, butanol, ethylene glycol mono n-hexyl ether, ethylene glycol monobutyl ether, ethylene glycol monoethyl ether, ethylene glycol monomethyl ether, ethylene glycol monophenyl ether, ethylene glycol monoisoamyl ether, the acetates of these ethers and the corresponding diethylene glycol ethers and acetates, etc. In addition to the preferred coupling agents noted above, other coupling agents are diacetone alcohol, dimethyl formamide, dimethyl acetamide, acetonitrile, tetrahydrofuran and Shell's Pent-Oxol (4-methoxy-4-methyl-2-pentanol). Generally, the coupling agents boil in the range of about 100 to 200° C. This constituent, as is the case with the others described, usually does not contain additional substituent groups although such may be present if the over-all effect desired is not materially reduced.

In preparing our water-dispersible vehicle the drying oil component and alkoxy polyalkylene glycol can be reacted at an elevated temperature, for instance, of about 150 to 250° C., preferably about 200 to 225° C., in the presence or absence of a catalyst. The pressure usually approximates atmospheric but higher or lower pressures may be employed. The reactants are mixed, for instance by efficient agitation, and advantageously the reaction mixture is blanketed with carbon dioxide, nitrogen or other gas which is inert to the reaction. The reaction may be conducted in the presence of an esterification or transesterification (alcoholysis) catalyst. Suitable esterification and transesterification catalysts include, among others, alkali metal earths, heavy metal oxides, heavy metal salts, etc. The preferred catalysts include litharge (PbO) and stannic chloride ($SnCl_4$). In general, when the reaction is performed without a catalyst, longer reaction times are needed.

The reaction time is that which gives a liquid, water dispersible product. The initial reaction mixture is not water-dispersible and as the reaction is extended, water-dispersible products are obtained. It is relatively easy, however, to follow the reaction by taking samples as the reaction progresses and testing the samples, for instance in a standard procedure in which the sample is mixed with water with or without a coupling solvent, to determine whether the product is water-dispersible. We have found it most advantageous to stop the reaction when the testing of the selected samples shows that the viscosity of the product in water approximates a minimum at some fixed dilution (e.g., 40% NV). The viscosity of the water dispersion of the reaction mixture decreases to a minimum as the reaction continues and then the viscosity increases. It is at or near, usually shortly after, reaching the minimum viscosity that we prefer the reaction to be stopped, as by discontinuing heating, in order that the vehicle can be brought to surface application viscosity with minimum water dilution and at maxmum paint solids to afford a product with better covering characteristics. Generally, the dilution to application viscosity gives about 25 to 75% paint solids, often about 35 to 60%. Moreover, as noted above, the alkoxy terminated polyethers are advantageous as they afford an extended reaction period during which products of desirable viscosity are obtained which materially reduces or entirely avoids the need for testing as the reaction proceeds.

The reaction product usually has a viscosity of up to about 100 poises or somewhat greater, and occasionally the viscosity less advantageously may be up to the order of about 1,500 poises. Often the viscosity does not exceed about 40 poises and most advantageously is less than about 10 poises, for instance about 5 to 10 poises. Usually the reaction time is about 1 to 12 or more hours; however, we prefer times of about 2 to 6 hours.

The essential drying oil component of the water-dispersible liquid reaction product of the present invention is an unsaturated, monocarboxylic acid ester, e.g., glyceride, whether natural or synthetic. The drying oil acid is usually a fatty or alkenyl carboxylic acid having about 14 to 20, preferably about 18, carbon atoms, and 1 to 3 or more, usually at least 2, unsaturated carbon-to-carbon or olefinic bonds. The drying oil component contains at least about 30%, preferably at least about 50%, by weight of polyunsaturated acid molecules, based on the total acid molecules. The alcohol portion of the ester is generally of an alkanol of up to about 12 carbon atoms and may be mono- or polyhydric. The alcohol portion is advantageously of an alkane polyhydric alcohol of 3 to 6 hydroxyl groups and 3 to 6 carbon atoms. The preferred alkanol source of the ester radical is glycerol which affords glycerides such as those occurring in nature.

The drying oil component combined with alkoxy polyalkylene glycol can be pre-reacted with an alcohol to form an ester. The esterifying alcohol can also be reacted concurrently with the alkoxy polyalkylene glycol. Alternatively, the acid can be reacted with an esterifying alcohol at the same time the drying oil component is being modified, for instance with a polyhydric alcohol and with or without another modifying constituent such as a polycarboxylic acid. Also, the reaction between the drying oil ester and the alkoxy polyalkylene glycol can take place during or following the modification. The esterifying and modifying alcohol may be the same material especially when esterification and modification are effected concurrently. It is preferred that the drying oil component be essentially in the ester form prior to reaction with the alkoxy polyalkylene glycol. Heat bodied or polymerized forms of the drying oil acids and esters are also useful. Thus the drying oil component may be the drying oil ester as such or the carboxylic ester can be modified through reaction with up to about 75 weight percent, preferably about 5 to 20 weight percent, of one or more modifying constituents, for instance polyfunctional compounds such as polyolefins, polycarboxylic acids and polyhydric alcohols. These acids and alcohols can also have olefinic unsaturation and the polyfunctional compound can be an olefinic monocarboxylic acid. The modification preferably involves a polyolefin or both of a dicarboxylic acid and polyhydric alcohol. For instance, the modifying polycarboxylic acid and polyhydric alcohol will usually be employed in approximately esterification stoichiometric proportions although either may be in excess. We prefer an excess of alcohol. Generally about 25 to 75 weight percent of each of the polycarboxylic acid and polyhydric alcohol based on their mixture is used in modifying the drying oil component with such materials. The various drying oil components can be further substituted with non-interfering substituents although they are most often employed in unsubstituted form. Regardless of its constituency the drying oil component is essentially liquid at ambient temperatures, and in general has a viscosity in the ranges set forth above with respect to the alkoxy polyalkylene glycol reaction product.

The drying, including semi-drying, oils which can be used in the preparation of the water-dispersible vehicles include the non-conjugated and conjugated unsaturated fatty acids and their synthetic esters, especially of polyhydric alcohols, as well as non-conjugated and conjugated natural drying oils of animal and vegetable origin, all having an iodine value not less than about 110. For example, soybean oil, linseed oil, safflower oil, tung oil, perilla oil, China-wood oil, oiticica oil, walnut oil, poppyseed oil, etc. are among the natural drying and semi-drying oils which may be used while the unsaturated acids include oleic, linoleic, linolenic, ricinoleic, elaeostearic, etc. Where tung oil or other natural conjugated oils are employed, it is preferred to first heat the oils to an elevated temperature of 280° C. or thereabouts to "gas-proof" or enable them to form non-wrinkling films, just as would be the case in their use in conventional organic solvent system paints or varnishes. Thus, the conjugated oils may be considered a special case of the modified oils which are operable. Similarly, glycerol and other higher polyhydric alcohol esters of the mixed fatty acids which characterize the natural drying and semi-drying oils may be employed. Included would also be the polyhydric alcohol esters of tall oil and of tall oil fatty acids.

When modified drying oils are used, the reaction of the drying oil ester component can be with a polycarboxylic acid, polyhydric alcohol or their mixture. These materials encompass aliphatic, including cycloaliphatic, and aromatic dicarboxylic acids of, for instance, 2 to 12, preferably 4 to 8, carbon atoms; representative acids are: the alpha, beta ethylenically unsaturated polycarboxylic acids, maleic, fumaric, aconitic, citraconic, itaconic, etc.; the saturated aliphatic polycarboxylic acids, succinic, glutaric, sebacic, azelaic, tartaric, etc.; and the aromatic or benzene polycarboxylic acids such as the phthalic acids. Also the acid anhydrides, esters, partial esters and other forms, can be employed.

The polyhydric alcohols employed in the modified drying oils are aliphatic, including cycloaliphatic, in character, and can be the same as those forming the ester portion of the drying oil component. The materials are alkane polyhydric alcohols generally of 3 to 6 carbon atoms and containing 3 to 6 hydroxyl groups to a molecule. Among the useful polyhydric alcohols are glycerol, mannitol, sorbitol, pentaerythritol, trimethylol propane, trimethylol ethane, 1,3,6-hexanetriol, etc., and these can be mixed with other materials, for instance ethylene glycol, diethylene glycol, dipentaerythritol, etc.

As stated, the drying oil component may be modified through reaction with a polyolefinic material. The olefins can be aliphatic, including cycloaliphatic, that is alkenyl, hydrocarbons. Usually the olefinic materials have about 4 to 8 carbon atoms, and among the useful materials are cyclopentadiene, cyclohexadiene, 1,4-butadiene, isoprene, etc.; however, polymers of these olefins containing about 2 to 10 units of monomer may also be employed. The modifying component can be mono-olefinic especially where it contains a condensing hydroxy or carboxyl group, such as in the lower alkenyl monocarboxylic acids.

Among the chemically modified oils which may comprise the hydrophobic oil or oleoresinous portion of the reactants may be listed (1) the so-called synthetic alcohol esters already described, which for instance can be prepared by heating fatty acids with higher polyhydric alcohols such as glycerol, pentaerythritol, sorbitol and the like by means well-known to the art; (2) the heat polymerized natural drying and semi-drying oils and synthetic esters described previously, said heat bodying likewise being old and well-known to the art; (3) maleic modified drying oils and semi-drying oils, made for instance as described in Schwarcman U.S. Patent 2,412,177 and the maleic modified drying oils and fatty acids made by the different processes described by Ellis U.S. Patent 2,033,131 and Clocker U.S. Patent 2,188,882; and (4) hydrocarbon copolymers of drying and semi-drying oils, including vinyl copolymers made as described in Schwarcman U.S. Patent 2,912,396 and others and diene copolymers made as described in Gearhart U.S. Patent 2,362,018. Dehydrated castor oil is also a suitable and desirable component, and may be considered a conjugated drying oil obtained by the chemical modification or dehydration of castor oil.

Oil modified phthalic and isophthalic alkyd resins may also be employed as the chemically modified oil component although we prefer the maleic acid (including the anhydride)-pentaerythritol modified oils. Those oils-modifier phthalic anhydride, or isophthalic acid-modified oils in which the oil content is about 65% or greater, and which are capable of being made at 100% non-volatile at viscosities of not significantly greater than about 100 poises may be employed. Specifically, such modified oils can be made as liquid materials without the use of naphtha or other petroleum or organic solvents. This fact is of great consequence to obtaining the unique liquid products of this invention, which are capable of thinning with water to obtain dispersions or solutions having very useful properties as paint vehicles and for other purposes.

The drying oil component can be modified by the described or other constituents under the usual conditions, e.g., temperatures of about 200 to 300° C. and pressures at or near atmospheric. Generally, the reaction is continued to insure a liquid product, for instance, prolonged heating may cause undesirable gelation, and most often the acid number of the liquid product is below about 20.

Although the drying oil component-alkoxy polyalkylene glycol liquid condensate can be dispersed in organic vehicles such as the usual paint thinners, the reaction product is water-dispersible and can be used most advantageously in aqueous based coating compositions containing other ingredients if desired such as solid pigments, fungicides, mildewcides, etc., particularly zinc oxide which can be added to the reaction product, for instance in amounts up to about 100 weight percent, most often greater than about 10 weight percent based on the reaction product. The aqueous based coating composition can have varying amounts of water with the amount usually being selected by the coating applicator according to the characteristics desired in the composition both during application and after drying. In many instances, the water will be sufficient to give a product of about 1 to 3 poises viscosity for application to surfaces. The coating composition can also contain solid pigments and other ingredients. The various agents such as the pigment and fungicide are preferably added to the drying oil component-alkoxy-polyalkylene-glycol reaction product prior to dilution for application as a coating.

The drying oil component-alkoxy polyalkylene glycol liquid reaction product may be employed in other ways, for instance in making pigment concentrates. In this use the concentrate is often a relatively thick mixture and may even be in a paste or essentially solid form. These concentrates usually contain little if any water although the concentrate is water-dispersible. The various water-insoluble organic and inorganic paint pigments can be employed such as titanium dioxide, zinc oxide, phthalocyanine blue, lead chromate yellows, molybdate orange, iron oxide red, and other organic and inorganic pigments as well as extender pigments such as talc, clay, mica, etc. Other uses for the water-dispersible reaction product are contemplated, for instance it may be mixed with water and employed as an insecticide vehicle, serving to hold the active insecticide ingredient on a plant or other surface upon which the composition is applied as by spraying.

The following examples are illustrative of the principles of this invention. Unless otherwise specified the reactions were conducted using carbon dioxide as an inert gas.

EXAMPLE 1

Alkali refined linseed oil was modified by alcoholysis at 250° C. with 3.9% pentaerythritol and subsequently by a reaction at 250° C. with 4.9% maleic anhydride to obtain an oil having a viscosity of 7 stokes or poises, an acid value (AV) of 7 and a Gardner color of 7.

2,000 g. of this modified oil, 278 g. of monomethoxy polyethylene glycol 350 (molecular weight is 350) and 0.4 g. of litharge were heated in a 3-liter flask provided with agitation and an inert gas cover of carbon dioxide to 220° C. and held at this temperature for 4 hours. The resultant product had a viscosity of 3.2 stokes. Upon dilution with tap water the viscosity increased to a maximum of 30 stokes at 60% NV (non-volatile). Upon further dilution the resultant emulsion became less viscous reaching 2.0 stokes at 40% NV.

EXAMPLE 2

Alkali refined linseed oil was modified by alcoholysis at 480° F. with 3.9% pentaerythritol and subsequent reaction at 480° F. with 4.9% maleic anhydride to give a modified linseed oil having a viscosity of 7 stokes. 1,186 parts of this oil, 213 parts of methoxy polyethylene glycol 350 (molecular weight 350, freezing point —5° C.) and 0.3 g. of PbO were heated together for 3 hours at 220° C. The clear resultant product has a viscosity of 3.5 stokes, an acid value of 6.7, Gardner color of 6.5 and Sp. Gr. of 0.9858 (15.5/15.5° C.). Upon aqueous dilution the vehicle became translucent and initially more viscous, achieving a viscosity maximum of 9.4 stokes at 70% NV. Upon further dilution the product became less viscous, achieving one stoke at 53% NV. This product can be used with or without a glycol ether as a coupling solvent. The effect of ethylene glycol monobutyl ether acetate was as follows:

| Ether-acetate, percent | Viscosity, poises | Solids when diluted with water to 1 poise, percent NV |
|---|---|---|
| 0 | 3.5 | 53 |
| 5 | 2.6 | 57 |
| 10 | 1.9 | 58 |

The effect of ethylene glycol monobutyl ether was:

| Glycol ether, percent | Viscosity, poises | Solids when diluted with water to 1 poise, percent NV |
|---|---|---|
| 0 | 3.5 | 53 |
| 5 | 2.8 | 52 |
| 10 | 2.0 | (¹) |

¹ Unstable.

With the product of the instant example, it can be seen that while more than one coupling solvent may be used, the preferred coupling solvent is dependent on base composition and properties desired in the final product.

When the vehicle was diluted to 60% NV with water and mixed with 1% of cobalt naphthenate (0.06% Co on solids), a 1.5 mil film was found to dry in about 5 hrs. whether the drying took place at 30, 55, or 75% relative humidity and room temperature conditions.

EXAMPLE 3

2,000 g. of modified linseed oil of Example 1, 417 g. of methoxy polyethylene glycol 350 and 0.6 g. PbO were heated under inert gas in a 3-liter flask to 220° C. and held at this temperature for 4 hours. The resulting product had a viscosity of 2.3 stokes. Upon aqueous dilution, the viscosity increased to a maximum of 11 stokes at 70% NV. Upon further aqueous dilution the emulsion became less viscous, reaching 1.25 stokes at 55% NV.

EXAMPLE 4

Similarly 2,000 g. of modified linseed oil of Example 1, 360 g. of methoxy polyethylene glycol 550 and 0.5 g. of PbO were reacted for 4 hours at 220° C. to obtain a clear product having a viscosity of 2.5 stokes. Upon aqueous dilution the product increased in viscosity to about 75% NV and then decreased in viscosity, reaching 1 stoke at 53% NV.

To the diluted vehicle without coupler solvent was added 0.05% Co (Nuodex Product's Cyclodex type) drier. A 1.5 mil film cast on glass plate was found to set in 4 hours and dry in about 8 hours.

The following table illustrates the effect of coupling solvent addition to the product prior to aqueous dilution. The first viscosity shown is obtained upon the addition of the coupler only. The percentage given is based on the oil-MPEG reaction product. Upon aqueous dilution the viscosity increases initially to a maximum viscosity, which is the second viscosity shown. Upon further aqueous dilution, the emulsion becomes less viscous, reaching application viscosity (1–3 stokes) at about 55% NV. All emulsions were stable.

| Coupler | | | Plus Aqueous Dilution | | |
|---|---|---|---|---|---|
| Percent | Type | Viscosity | Max. Viscosity | Visc. (55 NV) | Appearance (55 NV) |
| 0 | None | 2.5 (clear) | 1,600 stokes (75 NV) | 1.7 | Translucent emulsion. |
| 5 | Butoxyethanol | 2.2 (clear) | 85 stokes (80 NV) | 0.9 | White emulsion. |
| 10 | do | 1.5 (clear) | 25 stokes (75 NV) | 1.9 | Do. |
| 20 | do | 0.8 (clear) | 5.7 stokes (65 NV) | 2.0 | Do. |

EXAMPLE 5

Similarly if 417 g. of methoxy polyethylene glycol 550 is used as in Example 4, a clear product of 2.8 stokes is obtained. Upon aqueous dilution a translucent vehicle of 1.4 stokes viscosity is obtained at 50% NV.

EXAMPLE 6

If in Example 1, an equal weight of methoxy polyethylene glycol of 750 molecular weight (MPEG 750) were substituted for the MPEG 350, a clear product of 3.0 stokes is obtained. Upon aqueous dilution the vehicle increased in viscosity initially followed by a decrease. An emulsion with 1.1 stokes viscosity was obtained at 35% NV.

EXAMPLE 7

If in Example 6, the MPEG 750 were increased to 360 g., a clear product of 3.9 stokes is obtained. Upon aqueous dilution a translucent-milky dispersion of 1.2 stokes viscosity was obtained at 50% NV.

EXAMPLE 8

If in Example 6, the MPEG 750 were increased to 417 g., a clear product of 3.4 stokes is obtained. Upon aqueous dilution an emulsion of 1.4 stokes was obtained at 50% NV. When the product was reduced with 20% of butoxy ethanol prior to aqueous dilution, a clear product of 1.2 stokes was obtained. The subsequent aqueous dilution resulted in an emulsion of 1.4 stokes viscosity at 40% NV.

Figure 2:
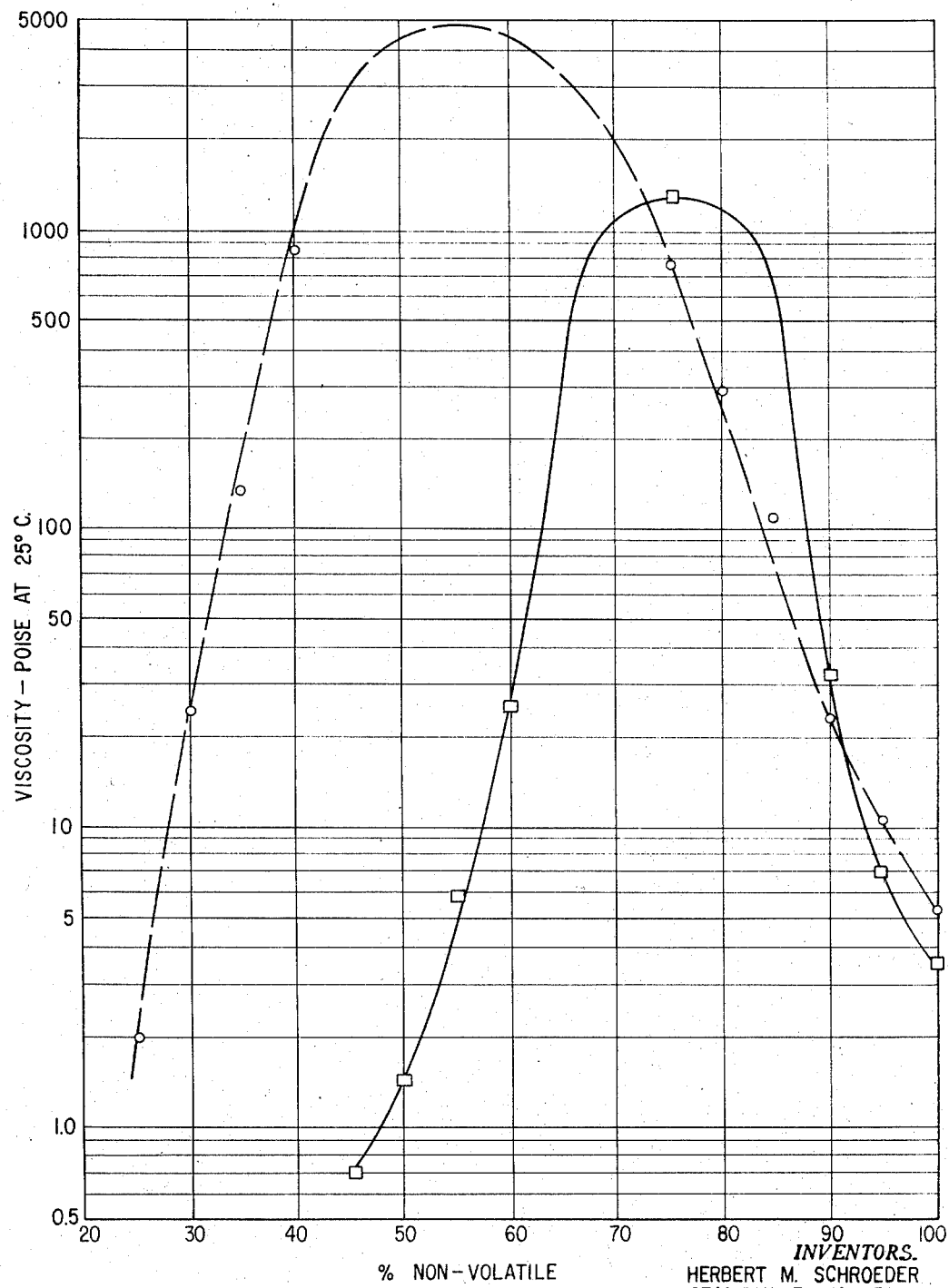

FIGURE 2 presents the aqueous dilution curve (solid line) for the reaction product of this example (without coupler) and compares it with a similar curve (broken line) for a product made from the same modified linseed oil and 17.2 percent of polyethylene glycol (PEG) 600. The vehicle of this invention was at application viscosity at about 45 to 55% non-volatile while the PEG 600 product did not reach this viscosity until about 25% non-volatile. Thus the product of this invention gives a much higher solids content at application viscosity which results in greater film coverage and durability per coat of paint.

EXAMPLE 9

This example illustrates the modification of a tall oil alkyd to make it water-dispersible. 3,000 grams of tall oil fatty acids (low rosin type, AV 191), 525 grams of pentaerythritol and 5.8 g. calcium naphthenate (5% calcium) were mixed and slowly heated together under inert gas to 240° C. and held at this temperature for 1.5 hours. After cooling to 150° C., 173 grams of maleic anhydride was added. The reaction mixture was reheated to 240° C. and held at this temperature for one hour. The final product had a viscosity of 12 stokes, a Gardner color of 6— and an acid value of 25.3.

To 828 grams of this tall oil alkyd was added 152 grams of methoxy polyethylene glycol 750 and 0.23 g. of litharge. The reaction mixture was heated under inert gas to 220° C. and held at this temperature for 6 hours. The product has a viscosity of 400 stokes, a Gardner color of 7 and an acid value of 11.9.

To 37.5 parts of this product was added 6.7 parts of butoxy ethanol and 49.6 g. tap water (40% NV). A stable semi-translucent dispersion of 0.4 stokes viscosity resulted. Stable dispersions were also obtained without the use of the coupling solvent. To the diluted vehicle was added Cyclodex driers in the amount of 0.6% Pb, 0.06% Co and 0.02% Mn (as metal based on percent NV). 3 mil wet films were cast on glass plates and found to dry in 8 to 24 hours giving clear, glossy films.

EXAMPLE 10

1,695 g. of dehydrated castor oil, viscosity 7.0 stokes; acid value 6.0 and Gardner color 5+, 305 g. of methoxy polyethylene glycol 350 and 0.46 g. PbO were heated together under inert gas to 220° C. and sampled after 4, 6 and 8 hours at this temperature. The 6-hour samples had a viscosity of 3.7 stokes, Gardner color of 5 and an acid value of 4.6. The aqueous dilution characteristics of these samples were esesntially the same, giving a viscosity at 45% NV of 1.9 to 1.7 stokes. Stable semitranslucent vehicles were obtained at this dilution. Upon the addition of the same level of driers as in Example 9, the 4-hour holding sample gave a film which "set" in 4 hours and dried with some residual tack in 7 hours.

EXAMPLE 11

85 parts of alkali refined linseed and 15 parts of dicyclopentadiene were copolymerized in an autoclave at about 280° C. to a viscosity of 21 stokes, an acid value of 2.1 and a Gardner color of 8—.

1,750 grams of this copolymer, 315 g. of methoxy polyethylene glycol 350 and 0.47 g. of PbO were heated together under inert gas to 220° C. and held at this temperature for 4 hours. The resultant product has a viscosity of 7.2 stokes, a Gardner color of 9 and an acid value of 2.4. Upon aqueous dilution with water only a viscosity maximum of 113 stokes was obtained at 65% NV. Upon further dilution, a stable semitranslucent dispersion of 0.9 stokes was obtained at 45% NV.

The same level of driers as in Example 9 was added and a film was cast. The clear continuous film was found to "set" in 4 hours and "dry" with some residual tack in 7 hours.

EXAMPLE 12

1,000 grams of alkali refined soybean oil, 28.5 grams of pentaerythritol and 1.2 grams of calcium naphthenate were mixed and heated together under inert gas in a closed vessel to 255° C. and held at this temperature for 2 hours. This alcoholysis product was then cooled to 150° C. and 36 grams of maleic anhydride was added. The reaction mixture was reheated to 255° C. and held at this temperature until an acid value of 15 was obtained. The temperature was then increased to 300° C. and held at this temperature until a viscosity of 17 stokes was obtained. The cooled resultant product had a viscosity of 22 stokes, a Gardner color of 7.5 and an acid value of 5.6.

830 g. of this modified soybean oil, 150 g. of methoxy polyethylene glycol 350 and 0.23 g. of PbO were mixed and heated together under inert gas in a closed vessel to 220° C. and held at this temperature for 6 hours. The resultant product had a viscosity of 5.8 stokes, a Gardner color of 9, and an acid value of 6.0.

Upon aqueous dilution a stable semitranslucent vehicle of 0.9 stokes was obtained at 45% non-volatile. After the addition of the same level of driers as in Example 9, a 3 mil wet film was cast on a glass plate. It gave a clear lustrous film, setting in 7 hours and drying with some residual tack in 24 and 48 hours.

EXAMPLE 13

750 g. of modified linseed oil of Example 1, 250 g. octoxy polyethylene glycol 600 (molecular weight 618; octyl alcohol reacted with eleven moles of ethylene oxide) and 0.38 g. of litharge were heated together in a 2-liter flask provided with an agitator and an inert gas cover of carbon dioxide to 220° C. and held at this temperature for 4 hours. The resultant product had a viscosity of 2.75 stokes, Gardner color of 7, and an acid value of 6.8. Upon the addition of water a viscosity of 4.0 stokes was obtained at 90% NV, 2.4 stokes was obtained at 80% NV and 1.4 stokes was obtained at 75% NV. These dilutions exhibited a slight haze. Upon further dilution to 45% NV the viscosity remained essentially the same but the vehicle became more hazy until an emulsion formed. Upon the addition of 0.6% Pb, 0.06% Co and 0.02% Mn as Cyclodex driers a 3 mil film cast from 50% NV, "set" in 3 hours and dried overnight.

EXAMPLE 14

482 g. of modified linseed oil of Example 1, 100 g. of $C_{13}H_{27}(OC_2H_4)_{15}OH$ and 0.15 g. of litharge were heated together in a 1-liter flask under nitrogen cover for 2 hours at 220° C. The resultant product had a viscosity of 28 stokes, a Gardner color of 8 and an acid value of 3.2. Upon addition of water the vehicle became initially more viscous and then less viscous reaching a viscosity of 2.2 stokes at 55% NV.

EXAMPLE 15

Similarly 482 g. of modified linseed oil of Example 1, 100 g. of an oleyl alcohol-40 mole (approx.) ethylene oxide reaction product, and 0.15 g. of litharge were heated together for 3 hours at 220° C. The resultant product was somewhat cloudy and thixotropic with an acid value of 2.2. 20% of hexoxyethanol was added giving a clear vehicles of 8.0 stokes viscosity at 83.3% NV. Upon dilution with water, the viscosity increased somewhat achieving a maximum of 4.6 stokes at 65% NV and then gradually decreased, achieving 0.7 stokes at 25% NV.

EXAMPLE 16

300 g. of modified linseed oil of Example 1, 100 g. of an aliphatic branch chain 18 carbon alcohol-12 mole ethylene oxide adduct (molecular weight, 800; hydroxyl value, 70) and 0.15 g. of litharge were heated together in a 1-liter flask provided with an agitator and an inert gas cover of carbon dioxide to 220° C. and held at this temperature for 4 hours. The resultant product had a viscosity of 6.1 stokes, Gardner color of 6 and an acid value of 8.4.

Upon the addition of 20% of the acetate of butoxy ethanol the viscosity was reduced to 1.6 stokes. Upon further dilution with water, the viscosity increased slightly reaching a maximum of 2.6 stokes at 50% NV. With further addition of water the viscosity decreased reaching 1.0 stoke at 46% NV. The resultant dispersion was milky but stable.

The same level of driers was added as in Example 13. A 1.5 mil film was found to "set" in 2½ hours and dry overnight.

EXAMPLE 17

847 g. of modified linseed oil of Example 1, 153 g. of an aliphatic branched chain 18 carbon alcohol-15 mole ethylene oxide adduct (molecular weight, 928 and hydroxyl value of 60) and 0.23 g. of litharge were similarly reacted together for 4 hours at 220° C. The resultant product was cloudy with a viscosity of 5.9 stokes. Upon the addition of 20% n-hexoxy ethanol a substantially clear vehicle of 1.8 stokes was obtained. Upon further dilution with tap water the viscosity initially increased, reaching a maximum of 3.0 stokes at 65% NV and then gradually decreased in viscosity, reaching 1.0 stoke at 37% NV. A translucent to milky vehicle which was stable resulted.

After the addition of the same amount of driers, clear lustrous film was obtained which "set" in 3 hours and dried overnight.

EXAMPLE 18

878 g. of modified linseed oil of Example 1, 122 g. of methoxy polyethylene glycol 2,000 and 0.18 g. of PbO were reacted together at 220° C. for 4 hours. 100 parts of the product was reduced with 20 parts of ethylene glycol monobutyl ether. Upon further dilution with water the dispersion became more viscous, achieving a viscosity maximum at about 60% NV. Upon further dilution the dispersion became less viscous, achieving 1 stoke viscosity at 31% NV and a milky appearance. The same level of driers was added as in Example 9. A 1.5 mil film of this vehicle was found to dry overnight.

EXAMPLE 19

A 60% oil modified soy alkyd was prepared by the alcoholysis of 300 g. of alkali refined soybean oil with 65.5 g. of glycerol (99.5%) and 0.1 g. of PbO at 250° C. for 2 hours. The reaction was carried out in a 1-liter flask equipped with inert gas inlet, agitator, thermometer, and reflux condenser with trap. The reaction mixture was cooled to 150° C. and 166.5 g. of crotonic acid was added, then reheated to 205° C. and held at this temperature for 6 hours. A dark product resulted having a viscosity of 1.6 stokes and an AV 0.65.

248.4 g. of this alkyd, 51.6 g. of MPEG 750 and 0.08 g. of PbO were heated together for 4 hours at 220° C. The resultant dark product had a viscosity of 7.5 stokes and an AV of 2.8. It could readily be diluted with water, increasing in viscosity initially to a viscosity maximum of 170 stokes at 80% NV and then decreasing to yield application viscosity at about 50% NV. The clear 3 mil film cast from this vehicle after the addition of 0.6% Pb, 0.03% Co and 0.03% Mn Cyclodex driers (Harshaw) dried overnight but retained some tack for several days.

EXAMPLE 20

A 60% soy alkyd was made by the alcoholysis of 600 g. of alkali refined soybean oil, 134 g. of glycerol and 0.2 g. of PbO, at a reaction temperature of 250° C. for 2 hours. After cooling to about 150° C. 259 g. of ortho phthalic anhydride, 46 g. of benzoic acid and 50 g. of xylene (for azeotropic water removal by means of a trap connected below the reflux condenser) were added. The reaction mixture was slowly heated to 245° C. at which time 22 ml. of water had been collected in the trap. The xylene was then distilled off; the resulting product had a viscosity of 98 stokes, Gardner color of 7 and an AV of 9.6.

423.5 g. of this alkyd, 76.5 g. MPEG 750 and 0.12 g. of PbO were reacted together for 4 hours at 220° C. The resultant product had a viscosity of 17 stokes, a Gardner color of 9 with some haze and an AV of 4.8. Upon addition of water, an emulsion formed of increasing viscosity to about 75% NV. Upon further addition of water the emulsion became less viscous, achieving a viscosity of 1.6 stokes at 50% NV. The emulsion was stable. The clear film cast from this vehicle after the addition of driers (as in Example 19) was found to dry overnight.

The alkoxy terminated polyether glycols have only one reactive hydroxyl group and the conditions and order of reaction are much less significant than when the polyether has 2 or more reactive hydroxyl groups. The following example illustrates the incorporation of the polyether with the polyol during the alcoholysis and before esterification.

EXAMPLE 21

600 g. of alkali refined soybean oil, 134 g. of glycerol, 179 g. of MPEG 750 and 0.47 g. of PbO are charged together into a 2-liter 3-neck flask, equipped with an inert gas flow, agitator, thermometer and a reflux condenser with a trap. These components are heated together for 2 hours at 250° C. The reaction mixture is cooled to about 150° C. and 259 g. o-phthalic anhydride, 46 g. benzoic acid and 50 ml. of xylene were added. The reaction mixture was slowly reheated to 250° C. and held at this temperature for 1 hour at which time 30 ml. of water had been collected in the trap. The resultant product had a viscosity of 27 stokes, a Gardner color of 11 with some haze and an AV of 9.0. The aqueous dilution was similar to the previous example with a stable emulsion of 1.8 stokes at 50% NV resulting. Film properties were also similar.

Compositions of this invention may also be made by a "fusion cook" procedure in which all the ingredients are charged at one time. This technique was used in the following example.

EXAMPLE 22

400 g. alkali refined soybean oil, 245 g. of o-phthalic anhydride, 245 g. benzoic acid, 178 g. of 99.5% glycerol, 180 g. MPEG-750 and 0.54 g. PbO were slowly heated together in the same type of equipment as the previous example to a temperature of 250 to 260° C. and held in this temperature range for about 2 hours. 62 ml. of water was collected in the reflux condenser trap. The resultant product had a viscosity of 46 stokes, a Gardner color of 8 with some haze and an AV of 11.5. Upon aqueous dilution a viscosity maximum was obtained at about 78% NV and an application viscosity of 1.2 stokes was obtained at 50% NV. The film performance was similar to the films of the two previous examples.

To further illustrate the flexibility of the order of reaction of this invention, the following example demonstrates the preparation of acidolysis as the first step.

EXAMPLE 23

600 g. of alkali refined soybean oil, 291 g. of isophthalic acid, 46 g. benzoic acid and 0.47 g. of litharge were heated together in equipment similar to that previously illustrated to about 250° C. and held at this temperature for about 3 hours. The reaction mixture was cooled to about 150° C. and 134 g. of 99.5% glycerol, 179 g. of MPEG–750 and 50 ml. of xylene were added. The reaction mixture was slowly reheated to 250° C. and held for about 1 hour. The resultant product had a viscosity of 98 stokes, a Gardner color of 7 and an AV of 14.3. The aqueous dilution was similar to those of the previous examples but was somewhat translucent in appearance. A viscosity of 3.3 stokes was obtained at 55% NV and 0.7 stokes at 50% NV. The clear film cast from this vehicle after the addition of driers (as in Example 19) was found to "set" in 2 hours and dry overnight.

EXAMPLE 24

Using the same equipment as in Example 21, 400 g. of alkali refined soybean oil, 213 g. of 99.5% glycerol, 179 g. MPEG–750 and 0.59 g. PbO were heated together for 2 hours at 250° C. The reaction mixture was cooled to 150° C. and 442 g. of o-phthalic anhydride was added. The reaction mixture was heated to 250° C. in 2 hours and held at this temperature for an additional 20 minutes. The xylene was distilled off; 55 ml. of water of reaction was collected in the reflux trap. The resulting product had a viscosity in excess of 1,000 stokes, a Gardner color of 8, and an AV of 12.5. Upon aqueous dilution, a stable emulsion of 2.1 stokes was obtained at 45% NV. The clear cast film from this vehicle after addition of driers (as in Example 19) was found to dry overnight.

It is claimed:
1. A liquid, water-dispersible composition of matter having a viscosity of up to about 100 poises which is a reaction product of a mixture consisting essentially of about 70 to 90% of a drying oil ester of an unsaturated fatty acid of 14 to 20 carbon atoms and a polyhydric alkanol of 3 to 6 carbon atoms and having 3 to 6 hydroxyl groups, said drying oil ester being modified with about 5 to 40% of monomer or polymer of 2 to 10 monomer units of dialkenyl hydrocarbon of 4 to 8 carbon atoms, and about 10 to 30% of an alkoxy polyalkylene glycol of the formula:

$$RO[(CH_2)_2O]_yH$$

wherein $y$ is an integer giving a molecular weight of about 200 to 2,500 and R is an alkyl radical of up to 20 carbon atoms.

2. The composition of claim 1 in which the drying oil ester is a glyceride.
3. The composition of claim 1 in which the drying oil ester is linseed oil.
4. The composition of claim 1 which contains about 10 to 100% zinc oxide based on said reaction product.
5. The composition of claim 1 having added thereto about 5 to 25% of a water and oil coupling agent boiling in the range of about 100 to 200° C. and having the formula $$RO(CH_2CH_2O)_xR_1$$

wherein R is a lower alkyl radical of up to about 8 carbon atoms, $x$ is 1 to 2, and $R_1$ is hydrogen or —$COCH_3$.

6. The composition of claim 1 in which the drying oil ester is modified with dicyclopentadiene.
7. The composition of claim 6 in which the drying oil ester is linseed oil.
8. The composition of claim 6 having added thereto about 5 to 25% of a water and oil coupling agent boiling in the range of about 100 to 200° C. and having the formula $$RO(CH_2CH_2O)_xR_1$$

wherein R is a lower alkyl radical of up to about 5 carbon atoms, $x$ is 1 to 2, and $R_1$ is hydrogen or —$COCH_3$.

9. The composition of claim 8 in which the coupling agent is ethylene glycol monobutyl ether acetate.
10. The composition of claim 1 in which the drying oil ester is a semi-drying oil ester.
11. The composition of claim 10 in which the semi-drying oil ester is soybean oil.

References Cited

UNITED STATES PATENTS
2,963,380  12/1960  Leipen _____ 106—253

OTHER REFERENCES
Armitage et al., "Journal of Oil and Color Chemists Association," vol. 40, pp. 849–62, London.

Hackh's "Chemical Dictionary," 2nd ed., (1937), p. 244.

Condensed Chemical Dictionary, 6th ed. p. 295, Reinhold Pub. Co., N.Y.

DONALD J. ARNOLD, *Primary Examiner.*

U.S. Cl. X.R.

106—252, 263, 259, 253, 256